United States Patent
Burger et al.

(10) Patent No.: US 6,957,641 B2
(45) Date of Patent: Oct. 25, 2005

(54) ADJUSTMENT DEVICE FOR AN INTERNAL COMBUSTION ENGINE

(75) Inventors: Frank Burger, Duren (DE); Norbert Ludwig, Bruggen (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/844,360

(22) Filed: May 13, 2004

(65) Prior Publication Data

US 2005/0000491 A1 Jan. 6, 2005

(30) Foreign Application Priority Data

May 14, 2003 (DE) ......................................... 103 21 653

(51) Int. Cl.⁷ .............................. F02D 9/10; G05D 3/16
(52) U.S. Cl. ..................... 123/399; 318/254; 324/207.2
(58) Field of Search ................. 123/361, 399; 318/254, 280, 439, 721; 324/207.2, 207.25; 137/554; 251/129.11

(56) References Cited

U.S. PATENT DOCUMENTS

| | | | | |
|---|---|---|---|---|
| 6,304,077 B1 | * | 10/2001 | Sorsa et al. | 324/207.2 |
| 6,377,005 B1 | * | 4/2002 | Zintler et al. | 318/9 |
| 6,563,305 B1 | * | 5/2003 | Sorsa et al. | 324/207.2 |
| 6,701,892 B2 | * | 3/2004 | Wayama et al. | 123/399 |
| 2003/0146721 A1 | * | 8/2003 | Burger et al. | 318/254 |
| 2004/0007067 A1 | * | 1/2004 | Meyer et al. | 73/514.31 |

FOREIGN PATENT DOCUMENTS

| | | |
|---|---|---|
| DE | 3719145 A1 | 12/1988 |
| DE | 3726885 C2 | 2/1989 |
| DE | 19848081 A1 | 3/2000 |
| DE | 101 00 966 A1 | 7/2002 |
| DE | 10134937 A1 | 2/2003 |
| DE | 102 04 199 A1 | 8/2003 |
| EP | 0932025 A1 | 7/1999 |
| EP | 0932026 A1 | 7/1999 |

OTHER PUBLICATIONS

"Hall Effect Transducers; How to apply them as sensors", Micro Switch, a Honeywell Division, 1982, pp. 38–47.

* cited by examiner

Primary Examiner—Tony M. Argenbright
(74) Attorney, Agent, or Firm—Griffin & Szipl, P.C.

(57) ABSTRACT

The invention relates to an adjustment device (1) for an internal combustion engine, particularly for adjustment of shafts with adjusting members. Heretofore known open/close switches are relatively large and cost-intensive in their production. For this reason, an adjustment device (1) is proposed, in which a set of gears (5) simply comprising a worm (7) and a partial ring worm gear (8) wherein pin magnets are disposed on the partial ring worm gear. The pin magnets (11) work functionally together with a non-moving switch (16) disposed in a housing (2,3) when a signal is produced by means of the magnetic field of the magnets (11) passing by the switch (16), which stops motor (4) and, as the case may be, predetermines a direction change. Thus, a right/left movement of the motor (4), along with a timely turning off of the motor can be achieved with only one external control signal.

20 Claims, 2 Drawing Sheets

ADJUSTMENT DEVICE FOR AN INTERNAL COMBUSTION ENGINE

RELATED APPLICATIONS

This application claims priority on German Patent Application No. 103 21 653.7, filed May 14, 2003, the entire disclosure of which is incorporated herein by reference.

1. Field of the Invention

The invention relates to an adjustment device for an internal combustion engine having a housing in which a drive motor is disposed that is connected with an adjustment member over a set of gears and a shaft, whereby at least one magnet is functionally connected to a non-moving switch fixed in the housing, particularly a Hall switch disposed in a fixed, pre-determined position with respect to the shaft, the magnet being moveably disposed with respect to the shaft, so that with movement of the magnet, the non-moving switch detects a pole reversal and produces at least one signal that works a control device.

2. Background of the Invention

The adjustment device for adjusting adjusting members disposed on a shaft, for example, switching flaps, regulating flaps or twist flaps in internal combustion engines, are known, in general, and are described in a multiplicity of patent applications. In many of these examples, it is sufficient to provide an adjustment device in which two differing end positions, for example, angular positions, can be reliably controlled. In the case of the above-mentioned flaps, these are at least angular positions of 0 and 90 degrees.

In DE 10100966 A1, a control apparatus for an adjusting member is described in which a motor is switched off if the magnetic field of a diametral magnet produces a signal by a positional change with respect to a Hall switch. In this case, the diametral magnet is connected to the adjustment member over a shaft. The drive of the adjustment device results over an electric motor and connected set of gears.

In the German Application Number 10204199, published Aug. 7, 2003, a further control device for a control apparatus is described in which a signal is produced when the adjustable adjusting member reaches a position to which it should be adjusted, wherein a subsequent direction of the motor can be preset by the signal. In this case, a signal is prepared from the Hall switch that works together with a magnet at an appropriate position of the adjusting member, which signal is led to a logic circuit, where it is compared with a positioning signal directed into the logic circuit by another input. An actuation signal for the motor is output by a subsequent bridge end switch. The production of the signal at the Hall switch uses either a segmented diametral magnet, wherein the corresponding signal in the Hall switch is produced with a pole reversal between north and south, or a ring magnet, or, as the case may be, partial ring magnet, wherein the Hall switch produces the necessary signal not after a pole reversal, but rather upon achieving a pre-determined voltage value that is programmable.

The described adjustment devices with segmented dimetral magnets or ring magnets have the disadvantage, however, that the production of the magnets is cumbersome and cost-intensive and its positioning in the adjustment device requires an increased building space requirement. In addition, fastening of the magnet in the adjustment device is relatively cumbersome. An optimized embodiment of the complete adjustment device for further space and manufacturing cost minimization is not even described.

In accordance with the above, it is an object of one skilled in the art to produce an adjustment device that is inexpensive to produce, has smaller space requirements and allows reliable adjustment of the desired end positions.

SUMMARY OF THE INVENTION

This object is solved in that two pin magnets of differing polarity are positioned fixed in a pre-determined position with respect to the shaft of the adjustment member and functionally connected to the non-moving switch, whereby the signal produced serves to preset the running direction of the motor. Such pin magnets can be designed to be very small and are relatively inexpensive to produce. If the magnet is positioned sufficiently close to the switch (for example, a switch designed as a Hall switch), it produces a signal based on the magnetic field impinging upon it, which signal can be processed according to the German Application No. 10204199. According to the polarity of the operating magnet, the signal can be processed in the subsequent logic circuit as 0 or 1. The electric motor stops if this signal corresponds to an external control signal applied to a second input of the logic circuit. The electric motor turns with various input signals applied to the logic circuit, whereby the turning direction of the motor is pre-determined by the signal of the Hall switch. In this manner, a right/left operation of the motor is achieved with only one external control signal. It is, of course, also possible to utilize other logic circuits so that, for example, a stopping of the motor can be programmed by differing input signals.

In a preferred embodiment, the pin magnets can be arranged in an angle to one turning axis of the drive shaft, which corresponds substantially to the adjustment angle between end positions of the shaft. In this way, and in a simplified manner, an end position switching can be realized by a single, non-moving switch without subsequent gearing steps.

In an advantageous embodiment of the invention, the pin magnets are arranged in a partial ring worm gear, which is at least rotationally fixed to a drive shaft of the drive and is driven by a worm gear that is connected in a rotationally-fixed manner with a drive shaft of the motor. By means of such an embodiment, it is possible by reducing the number of components to decrease the necessary construction space. According to the necessary end position of the shaft to be driven and therefore the flap, the partial ring worm gear extends, according to its construction simply over 90 or 180 degrees, so that further construction size can be saved. In order to simplify the fixing of the pin magnets and to improve the disposition with respect to the non-moving switch, the pin magnets can be disposed on the partial ring worm gear, rather than on the drive shaft of the drive.

In order to simplify assembly, the partial ring worm gear can have two receptacles in which the pin magnets are form-fittingly disposable, whereby a further positioning of the magnets with respect to the non-moving switch is no longer necessary.

In an alternative embodiment, the pin magnets are simply glued to the partial ring worm gear, whereby it is possible to produce an adhesive connection in addition to the form fitting reception.

In an advantageous embodiment, the housing comprises two journal positions in which the drive shafts of the drive are journaled, wherein the first journal position is open to the outside and the second journal position is closed to the outside, and whereby the drive shaft is so constructed, at its end facing the first journal position that the coupling of the driven shaft of the positioning member is form fittingly connectable to the drive shaft. By means of this embodiment, the complete adjustment device can be preassembled and connected to any desired number of shafts being driven without the necessity that these shafts be journaled in the positioning device. This results in a modular construction with numerous possibilities to have things built in. The coupling between the drive shaft of the drive and the driven shaft simplifies the construction of the adjustment device significantly.

In addition, the housing can be embodied in two parts, wherein a first housing part has disposed thereon the first journal position, an electrical connection for a plug as well as receptacles for fixing a conduction plate on which electronic building blocks and the non-movable switch can be disposed, as well as the electric motor and the drive, and the second housing portion can comprise the second journal position, whereby by connecting the second housing portion with the first housing portion, a relatively tight seal, and fixed positioning of all built in components of the adjustment device can be achieved. By means of this embodiment, plugging together of the individual parts and thereby also automatic assembly of the positioning device is enabled, whereby further costs can be saved. The positioning device is furthermore shielded from external influences by a tight seal achieved by the connection between the two housing portions.

One such positioning device according to the present invention has extremely small construction space requirements and is, at the same time, cost effective to produce and assemble. This allows a further wear free and movement free flap control, by means of right-left drive of the preprogrammable angular end positions. By means of its size and modular construction, the present invention is, for flap adjustment universally applicable and in the motor.

Thus, in accordance with a first apparatus embodiment of the present invention, an adjustment device for an internal combustion engine is provided, wherein the adjustment device includes: (a) a housing; (b) a drive motor disposed in the housing; (c) a first adjusting member drive shaft; (d) a set of gears operationally connected to the first adjusting member drive shaft and operationally connected to the drive motor; (e) a control device; (g) a non-moving Hall switch disposed fixedly in the housing; and two pin magnets of differing polarity disposed in a fixed, pre-determined position to the first adjusting member drive shaft, and functionally-connected to the non-moving Hall switch, and disposed so the non-moving Hall switch detects a polarity change with movement of the magnets and produces at least one signal, wherein the Hall switch is operationally connected to send the at least one signal to the control device, wherein the at least one signal serves to preset the running direction of the drive motor.

In accordance with a second apparatus embodiment of the present invention, the first apparatus embodiment is modified so that the pin magnets are disposed at an angle with respect to a rotational axis of the first adjusting member shaft, the angle corresponding substantially to an adjustment angle between end positions of the first adjusting member drive shaft.

In accordance with third and fourth apparatus embodiments of the present invention, the first and second apparatus embodiments, respectively, are further modified to include: (h) a second drive shaft operationally connected to the motor, wherein the set of gears further comprises a partial ring worm gear; and (i) a worm engaging the partial ring worm gear and operationally connected to the second drive shaft, wherein the pin magnets are disposed fixed with respect to the partial ring worm gear, and wherein the partial ring worm gear is at least rotationally fixedly connected to the first adjusting member drive shaft, and wherein the worm is rotationally fixedly connected to the second drive shaft of the motor.

In accordance with fifth and sixth apparatus embodiments of the present invention, the third and fourth apparatus embodiments are respectively modified so that the partial ring worm gear comprises two recesses in which the two pin magnets are, respectively, form fittingly disposed.

In accordance with seventh and eighth apparatus embodiments of the present invention, the fifth and six apparatus embodiments are respectively modified so that the pin magnets are glued to the partial ring worm gear.

In accordance with ninth, tenth, eleventh and twelfth apparatus embodiments of the present invention, the first, second, fourth and sixth apparatus embodiments are respectively modified so that the housing includes first and second journal positions in which the adjusting member drive shaft is journaled, wherein the first journal position is open to an outside of the housing, and the second journal position is sealed to the outside of the housing, and wherein the first adjusting member drive shaft has an end disposed in the first journal position and form fittingly connectable to a driven shaft operationally connected to the adjusting member.

In accordance with thirteenth, fourteenth, fifteenth and sixteenth apparatus embodiments of the present invention, the ninth, tenth, eleventh and twelfth apparatus embodiments, respectively, are further modified so that the housing includes a first housing portion and a second housing portion, and a conductor plate having said non-moving Hall switch and electronic building blocks disposed thereon; wherein the first housing portion comprises the first journal position, the drive motor and the set of gears, and further comprises an electrical connection for a plug and one or more receptacles dimensioned to fix the conductor plate, and wherein the second housing portion comprises the second journal position; and wherein connection of the second housing portion with the first housing portion achieves a substantially tight seal of the adjustment device and a fixed positioning of parts disposed in the housing.

In accordance with seventeenth, eighteenth and nineteenth apparatus embodiments of the present invention, the first, second and sixteenth apparatus embodiments are further modified so that the control device includes a logic circuit and a bridge end circuit.

In accordance with a first method embodiment of the present invention, a method for controlling the position of an adjusting member of an internal combustion engine is provided, wherein the method includes the steps of: (a) providing an adjustment device comprising: (i) a housing; (ii) a drive motor disposed in the housing; (iii) a first adjusting member drive shaft; (iv) a set of gears operationally connected to the first adjusting member drive shaft and operationally connected to the drive motor; (v) a first control device having a logic circuit and a bridge end circuit; (vi) a non-moving Hall switch disposed fixedly in the housing; and (vii) two pin magnets of differing polarity disposed in a fixed, pre-determined position to the first adjusting member drive shaft, and functionally-connected to the non-moving Hall switch, and disposed so the non-moving Hall switch detects a polarity change with movement of the magnets and produces at least one signal, wherein the Hall switch is operationally connected to send the at least one signal to the control device, wherein the at least one signal serves to preset the running direction of the drive motor; and (b) feeding a positioning signal from an external control device to the first control device; and (c) comparing the positioning signal from the external control device with the signal of the Hall switch; wherein, when the result of the comparison of the positioning signal with the Hall switch signal is that no definite signal is sent from the Hall device and neither of the pin magnets impinges on the Hall switch, then the signal from the control device is sent through to the motor and the motor continues to run, and when the result of the comparison of the positioning signal with the Hall switch signal is that a definite signal is sent from the Hall switch and one of the pin magnets is close enough to the Hall switch to switch the Hall switch, then the motor is stopped.

Further objects, features and advantages of the present invention will become apparent from the Detailed description of the Illustrative Embodiment, which follows, when considered together with the attached Drawings.

DETAILED DESCRIPTION OF THE ILLUSTRATIVE EMBODIMENT

Figure 1:
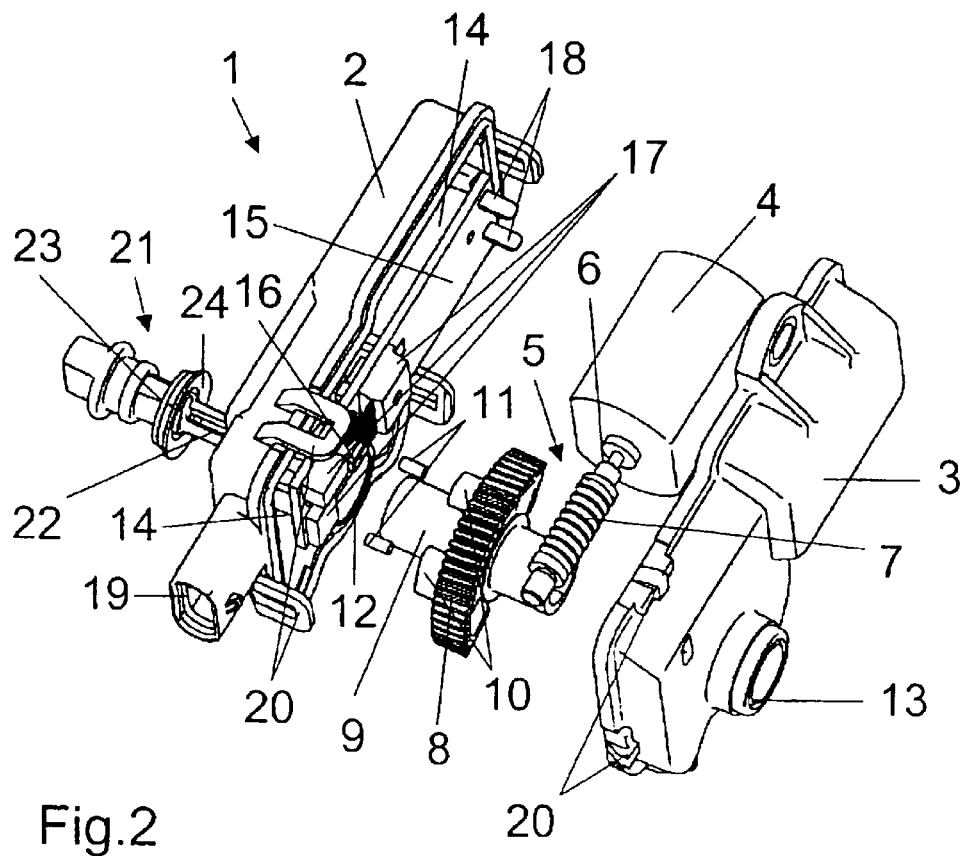
FIG. 1 shows an exploded representation of a perspective view of a positioning device according to the present invention.
Figure 2:
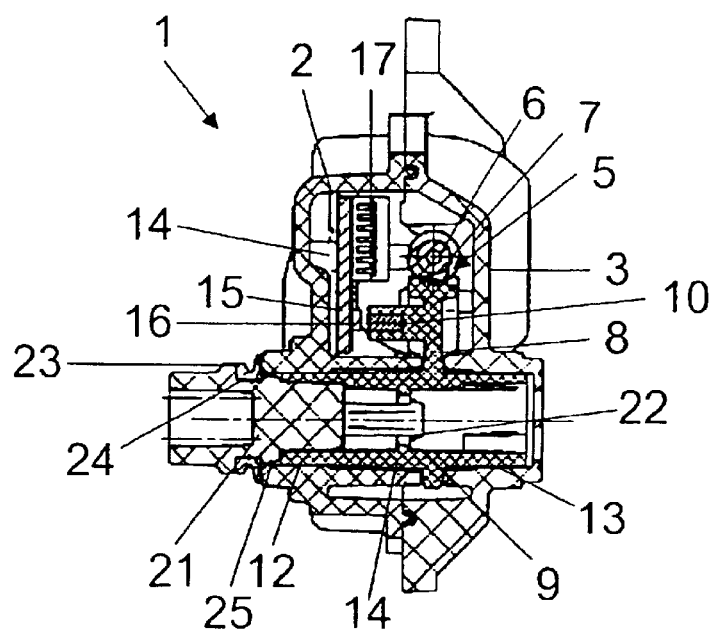
FIG. 2 shows a sectional representation of a positioning device according to the present invention as shown in FIG. 1 in side view.

The represented adjustment device 1 comprises a two part housing 2,3 in which an electromotor 4 is positioned, which drives a flap shaft 26 (see FIG. 3) over a drive 5. The electromotor 4 comprises a second drive shaft 6, on which a worm 7 is fixedly positioned. The worm 7 engages the toothing of a worm gear, which is embodied as a partial ring worm gear 8 and extends in the present embodiment over an angle of 90 degrees. Naturally, it is possible, according to the required application, in the event that greater positioning angles, for example, from 0 to 180 degrees are necessary, that this partial ring worm gear be provided with a greater possible running angle of the ring section.

The partial ring worm gear 8 is fixedly-positioned on the drive shaft 9 of the drive 5 and comprises two receptacles 10 that are disposed relative to one another at an angle of about 90 degrees and serve to fix two pin magnets 11 of different polarity. The first adjustment member drive shaft 9 is journaled into journal positions 12,13, wherein the first journal position 12 is disposed in housing portion 2 and the second journal position 13 is disposed in housing portion 3. Furthermore, housing portion 2 comprises receptacles 14, which serve to fix the conductor plate 15, electric motor 4 and the drive 5 in the housing portion 2. A Hall switch 16, along with further electronic building blocks 17, is positioned on the conductor plate 15. Conductor plate 15 further comprises connection contacts 18 for the electromotor 4. A further connection 19 for a plug is also positioned in housing portion 2, by which the conductor plate and thereby the electromotor 14 and the Hall switch 16 can be electrically connected with a voltage source, or, as the case may be, connected with the motor control. The Hall switch 16 is so positioned on the conductor plate 15 so that it is switched by turning of the partial ring worm gear 8 to the desired end position and by means of the magnetic field that is then directly applied by the opposing pin magnets 11.

Figure 3:
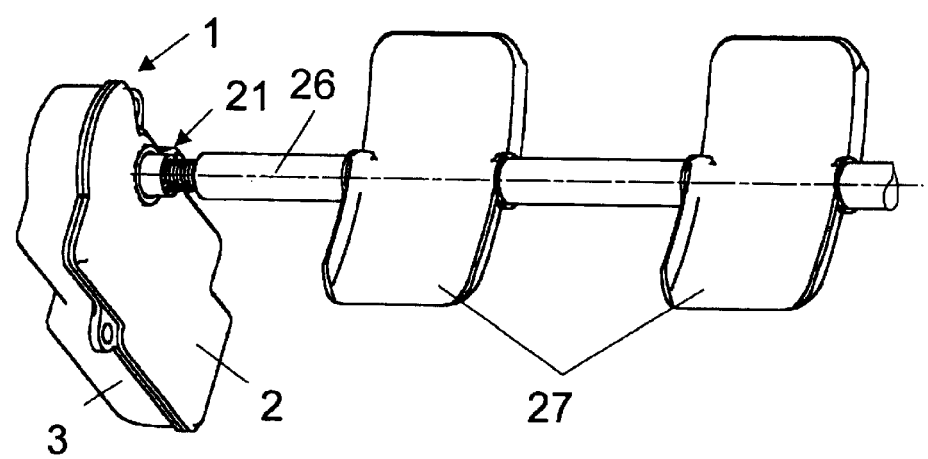
FIG. 3 shows a perspective view of the adjustment device 1 in which coupling 21 is attached to the driven flap shaft 26 on which adjustment members 27 are disposed.

The construction of the positioning device is carried out so that the first housing portion is provided with the conductor plate 15 on which the Hall switch 16 and the electronic building blocks 17 are already positioned. Subsequently, the electromotor 4 and worm 7 are stuck onto the connection contacts 18 of the connector plate 15, whereby electromotor 4 assumes a fixed position in receptacle 14 and the shaft of worm 7 takes a fixed position in housing portion 2 in the provided journal positions. Subsequently, the partial ring worm gear 8 is inserted in the first journal position 12 of housing portion 2 along with the preassembled pin magnet 11. Because the provided positioning of building components (4–9,15) is prefixed in housing portion 2, the second housing portion 3 can, for example, be connected with housing portion 2 by means of a clip connection 20 so that the first adjustment member drive shaft 9 is made to rest in the second journal position 13 and the adjustment device 1 therefore becomes completely tightly sealed. In addition, the second journal position 13 is embodied so that it is sealed to the outside. The first journal position 12 is made open so that the connection of the driven flap shaft 26 is enabled. The driven flap shaft 26 can either be directly or operationally connected to the adjusting member 27 as shown in FIG. 3. This connection results by means of a coupling 21 (See FIG. 1), whose first end is a form fitting clip connection 22 that is fixedly attached to the first adjusting member drive shaft 9. A heel 23 is found on the coupling, on which a seal 24 is positioned, which seals an opening 25 of the housing portion 2 after the assembly. The coupling 21 can comprise a recess on its second end that is formed so that a shaft to be driven can be form fit and inserted into this recess, whereby torque transmission onto the shaft to be driven is carried out.

Figure 4:
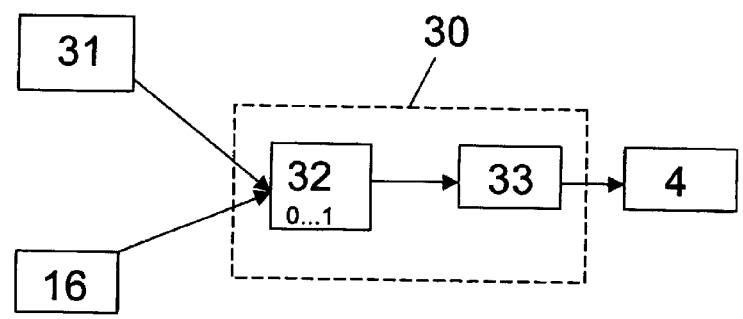
FIG. 4 shows a schematic representation of the adjustment device, and an embodiment of the first control device 30 according to the present invention having a logic circuit 32 and a bridge end circuit 33. A first control device 30 is shown operationally connected to receive a control signal from an external control device 31.

The electromotor 4 of adjustment device 1 is driven by means of a first control device 30, which comprises a logic circuit 32 and a bridge end circuit 33, as shown in FIG. 4. In this manner, the logic circuit 32 compares a positioning signal of a separate external control device 31 with a signal of Hall switch 16. If the positioning signal of the external control device 31 is input into the logic circuit of the first control device 30, this switches through depending on whether no definite signal is sent from the Hall switch 16, where, as a consequence, the positioning of the partial ring worm gear 8 is so determined, at this point in time, that none of the pin magnets 11 impinge upon the Hall switch 16 with their electrical fields. If the motor continues to turn due to the positioning signal of the external control device 31, then the position of the pin magnets 11 with respect to the Hall switch 16 changes until one of the pin magnets 11 is close enough to the Hall sensor so that the electrical field impinges upon it. Thereafter, the Hall switch 16 sends a definite signal to the logic circuit 32, whereby the electromotor 4 is turned off. In a simple embodiment, the logic circuit 32 is a simple AND switch, so that the motor 4 is stopped at equal signals 0, or as the case may be, 1 of the first control device 30 and the Hall switch 16. By means of the signal of the Hall switch 16, the drive direction change of the electric motor is prepared at the same time. In the case where the external control device changes its signal, the electric motor thus moves in the other direction over drive 5 of the driven shaft with flap positioned thereon, for a period until the Hall switch once again switches by passage of the second, different polarity pin magnet 11, so that once again two equal signals are input into the logic circuit, whereby the motor is once again stopped. The control device 30 can be positioned in the electronic building blocks 17, or any other position where it can be operationally connected to the motor 4 and external control device 31.

In this manner, it is no longer necessary at ignition of an internal combustion engine to sense the switch position of the Hall switch 16, the actual positioning of the shaft to be driven, or the electromotor 4. It is of course also possible to use a first control device different from that shown in FIG. 4, so that, e.g., the switching according to programming either takes place by identical or differing level adjustment on the logic circuit.

It is clear that the positioning device can be constructed to be extremely small because both the number and size of the parts of the drive are minimized. In addition, the construction space requirements are reduced by the non-moving control device with Hall sensor and pin magnets. Such a positioning device is very cost effective to produce, and, because of its small size, can be implemented almost anywhere in the motor space. By means of the simple modular construction, the assembly costs can be reduced.

It is clear that the control device of the positioning apparatus and, depending on the positioning angle, also the drive, or as the case may be the partial ring worm gear can be embodied in various manners. Even the position of the pin magnets with respect to one another, or, as the case may be, with respect to the Hall switch, can be varied according to embodiment and drive used without departing from the scope of the main invention. It is further conceivable to use other non-moving switches or to develop the fixing of components in the housing in a different manner.

Although the present invention has been described in terms of a non-limiting illustrative embodiment, one of ordinary skill in the art will recognize that additions, deletions, substitutions, modifications and improvements can be made while remaining within the scope and spirit of the present invention, as defined by the appended claims.

What is claimed is:

1. An adjustment device for an internal combustion engine, comprising:
   a housing;
   a drive motor disposed in the housing;
   a first adjusting member drive shaft;
   a set of gears operationally connected to the first adjusting member drive shaft and operationally connected to the drive motor;
   a control device;
   a non-moving Hall switch disposed fixedly in the housing; and
   two pin magnets of differing polarity disposed in a fixed, pre-determined position to the first adjusting member drive shaft, and functionally-connected to the non-moving Hall switch, and disposed so the non-moving Hall switch detects a polarity change with movement of the magnets and produces at least one signal, wherein the Hall switch is operationally connected to send the at least one signal to the control device, wherein the at least one signal serves to preset the running direction of the drive motor.

2. An adjustment device according to claim 1, wherein the pin magnets are disposed at an angle with respect to a rotational axis of the first adjusting member shaft, the angle corresponding substantially to an adjustment angle between end positions of the first adjusting member drive shaft.

3. An adjustment device according to claim 1, further comprising:
   a second drive shaft operationally connected to the motor, wherein the set of gears further comprises a partial ring worm gear; and
   a worm engaging the partial ring worm gear and operationally connected to the second drive shaft, wherein the pin magnets are disposed fixed with respect to the partial ring worm gear, and wherein the partial ring worm gear is at least rotationally fixedly connected to the first adjusting member drive shaft, and wherein the worm is rotationally fixedly connected to the second drive shaft of the motor.

4. An adjustment device according to claim 2, further comprising:
   a second drive shaft operationally connected to the motor, wherein the set of gears further comprises a partial ring worm gear; and
   a worm engaging the partial ring worm gear and operationally connected to the second drive shaft, wherein the pin magnets are disposed fixed with respect to the partial ring worm gear, and wherein the partial ring worm gear is at least rotationally fixedly connected to the first adjusting member drive shaft, and wherein the worm is rotationally fixedly connected to the second drive shaft of the motor.

5. An adjustment device according to claim 3, wherein the partial ring worm gear comprises two recesses in which the two pin magnets are, respectively, form fittingly disposed.

6. An adjustment device according to claim 4, wherein the partial ring worm gear comprises two recesses in which the two pin magnets are, respectively, form fittingly disposed.

7. An adjustment device according to claim 5, wherein the pin magnets are glued to the partial ring worm gear.

8. An adjustment device according to claim 6, wherein the pin magnets are glued to the partial ring worm gear.

9. An adjustment device according to claim 1, wherein said housing comprises first and second journal positions in which the adjusting member drive shaft is journaled, wherein the first journal position is open to an outside of the housing, and the second journal position is sealed to the outside of the housing, and wherein the first adjusting member drive shaft has an end disposed in the first journal position and form fittingly connectable to a driven shaft operationally connected to an adjusting member.

10. An adjustment device according to claim 2, wherein said housing comprises first and second journal positions in which the adjusting member drive shaft is journaled, wherein the first journal position is open to an outside of the housing, and the second journal position is sealed to the outside of the housing, and wherein the first adjusting member drive shaft has an end disposed in the first journal position and form fittingly connectable to a driven shaft operationally connected to an adjusting member.

11. An adjustment device according to claim 4, wherein said housing comprises first and second journal positions in which the adjusting member drive shaft is journaled, wherein the first journal position is open to an outside of the housing, and the second journal position is sealed to the outside of the housing, and wherein the first adjusting member drive shaft has an end disposed in the first journal position and form fittingly connectable to a driven shaft operationally connected to an adjusting member.

12. An adjustment device according to claim 6, wherein said housing comprises first and second journal positions in which the adjusting member drive shaft is journaled, wherein the first journal position is open to an outside of the housing, and the second journal position is sealed to the outside of the housing, and wherein the first adjusting member drive shaft has an end disposed in the first journal position and form fittingly connectable to a driven shaft operationally connected to an adjusting member.

13. Adjustment device according to claim 9,
wherein the housing comprises a first housing portion and a second housing portion, and a conductor plate having said non-moving Hall switch and electronic building blocks disposed thereon;
wherein the first housing portion comprises the first journal position, the drive motor and the set of gears, and further comprises an electrical connection for a plug and one or more receptacles dimensioned to fix the conductor plate, and
wherein the second housing portion comprises the second journal position; and
wherein connection of the second housing portion with the first housing portion achieves a substantially tight seal of the adjustment device and a fixed positioning of parts disposed in the housing.

14. An adjustment device according to claim 10,
wherein the housing comprises a first housing portion and a second housing portion, and a conductor plate having said non-moving Hall switch and electronic building blocks disposed thereon;
wherein the first housing portion comprises the first journal position, the drive motor and the set of gears, and further comprises an electrical connection for a plug and one or more receptacles dimensioned to fix the conductor plate, and wherein the second housing portion comprises the second journal position; and
wherein connection of the second housing portion with the first housing portion achieves a substantially tight seal of the adjustment device and a fixed positioning of parts disposed in the housing.

15. An adjustment device according to claim 11,
wherein the housing comprises a first housing portion and a second housing portion, and a conductor plate having said non-moving Hall switch and electronic building blocks disposed thereon;
wherein the first housing portion comprises the first journal position, the drive motor and the set of gears, and further comprises an electrical connection for a plug and
one or more receptacles dimensioned to fix the conductor plate, and wherein the second housing portion comprises the second journal position; and
wherein connection of the second housing portion with the first housing portion achieves a substantially tight seal of the adjustment device and a fixed positioning of parts disposed in the housing.

16. An adjustment device according to claim 12,
wherein the housing comprises a first housing portion and a second housing portion, and a conductor plate having said non-moving Hall switch and electronic building blocks disposed thereon;
wherein the first housing portion comprises the first journal position, the drive motor and the set of gears, and further comprises an electrical connection for a plug and
one or more receptacles dimensioned to fix the conductor plate, and wherein the second housing portion comprises the second journal position; and
wherein connection of the second housing portion with the first housing portion achieves a substantially tight seal of the adjustment device and a fixed positioning of parts disposed in the housing.

17. An adjustment device according to claim 1, wherein the control device comprises a logic circuit and a bridge end circuit.

18. An adjustment device according to claim 2, wherein the control device comprises a logic circuit and a bridge end circuit.

19. An adjustment device according to claim 16, wherein the control device comprises a logic circuit and a bridge end circuit.

20. A method for controlling the position of an adjusting member of an internal combustion engine, comprising the steps of:
(a) providing an adjustment device comprising:
i. a housing;
ii. a drive motor disposed in the housing;
iii. a first adjusting member drive shaft;
iv. a set of gears operationally connected to the first adjusting member drive shaft and operationally connected to the drive motor;
v. a first control device having a logic circuit and a bridge end circuit;
vi. a non-moving Hall switch disposed fixedly in the housing; and
vii. two pin magnets of differing polarity disposed in a fixed, pre-determined position to the first adjusting member drive shaft, and functionally-connected to the non-moving Hall switch, and disposed so that the non-moving Hall switch detects a polarity change with movement of the magnets and produces at least one signal, wherein the Hall switch is operationally connected to send the at least one signal to the control device, wherein the at least one signal serves to preset the running direction of the drive motor; and
(b) feeding a positioning signal from an external control device to the first control device; and
(c) comparing the positioning signal from the external control device with the signal of the Hall switch;
wherein,
(i) when the result of the comparison of the positioning signal with the Hall switch signal is that no definite signal is sent from the Hall device and neither of the pin magnets impinges on the Hall switch, then the signal from the control device is sent through to the motor and the motor continues to run, and
(ii) when the result of the comparison of the positioning signal with the Hall switch signal is that a definite signal is sent from the Hall switch and one of the pin magnets is close enough to the Hall switch to switch the Hall switch, then the motor is stopped.

* * * * *